United States Patent
Lehtinen et al.

(10) Patent No.: US 10,099,896 B2
(45) Date of Patent: Oct. 16, 2018

(54) ROPE TERMINAL ASSEMBLY AND A HOISTING APPARATUS

(71) Applicant: KONE Corporation, Helsinki (FI)

(72) Inventors: Hannu Lehtinen, Numminen (FI); Juha Helenius, Vantaa (FI)

(73) Assignee: KONE CORPORATION, Helsinki (FI)

( * ) Notice: Subject to any disclaimer, the term of this patent is extended or adjusted under 35 U.S.C. 154(b) by 201 days.

(21) Appl. No.: 14/963,553

(22) Filed: Dec. 9, 2015

(65) Prior Publication Data
US 2016/0185572 A1 Jun. 30, 2016

(30) Foreign Application Priority Data
Dec. 30, 2014 (EP) .................................... 14200510

(51) Int. Cl.
*B66B 7/08* (2006.01)
*F16G 11/04* (2006.01)

(52) U.S. Cl.
CPC ............ *B66B 7/085* (2013.01); *F16G 11/044* (2013.01)

(58) Field of Classification Search
CPC ....... F16G 11/044; F16G 11/048; B66B 7/085
See application file for complete search history.

(56) References Cited

U.S. PATENT DOCUMENTS

| | | | | |
|---|---|---|---|---|
| 1,408,144 A | * | 2/1922 | Snow | F16G 11/048 403/275 |
| 2,848,776 A | * | 8/1958 | Campbell | F16G 11/048 403/15 |
| 2,966,653 A | * | 12/1960 | Jugle | H01R 4/52 24/136 R |
| 3,056,852 A | * | 10/1962 | Sachs | H01R 13/585 16/2.5 |
| 3,163,902 A | * | 1/1965 | Bernburg | F16G 11/048 403/369 |

(Continued)

FOREIGN PATENT DOCUMENTS

DE 102008018191 A1 10/2009

*Primary Examiner* — Minh Truong
(74) *Attorney, Agent, or Firm* — Birch, Stewart, Kolasch & Birch, LLP

(57) ABSTRACT

A rope terminal assembly of a hoisting apparatus includes a first compression member having a first contact face and a second compression member having a second contact face. The compression members are placed such that their contact faces face each other and delimit between them a gap. A belt-shaped rope having a thermoplastic polymer coating forming the outer surface of the rope is placed in the gap, the contact faces of the compression members compressing against opposite wide sides of the belt-shaped rope. One or both of the compression members includes on the contact face thereof, and/or in proximity of the contact face thereof, one or more indentations, each indentation forming a cavity in the compression member which is in open connection with the gap and arranged to be empty when the thermoplastic polymer coating of the rope compressed by the contact face is solid, and to receive via said open connection thermoplastic polymer coating of the rope flowing from the gap pushed by the compression when the thermoplastic polymer coating melts. An elevator is provided with the rope terminal assembly.

13 Claims, 4 Drawing Sheets

(56) References Cited

U.S. PATENT DOCUMENTS

| | | | | |
|---|---|---|---|---|
| 3,600,765 | A | * | 8/1971 | Rovinsky .............. F16G 11/048 24/122.6 |
| 4,671,034 | A | * | 6/1987 | Rehm ....................... E04C 5/12 52/223.13 |
| 7,607,204 | B2 | * | 10/2009 | Ach ........................ B66B 7/085 187/411 |
| 2007/0034454 | A1 | * | 2/2007 | Dold ....................... B66B 7/062 187/411 |
| 2008/0279622 | A1 | * | 11/2008 | Al-Mayah ............... E04C 5/085 403/374.1 |
| 2008/0282512 | A1 | | 11/2008 | Ach |
| 2011/0042170 | A1 | * | 2/2011 | Faletto ................... B66B 7/085 187/266 |
| 2014/0182975 | A1 | | 7/2014 | Ikonen et al. |

\* cited by examiner

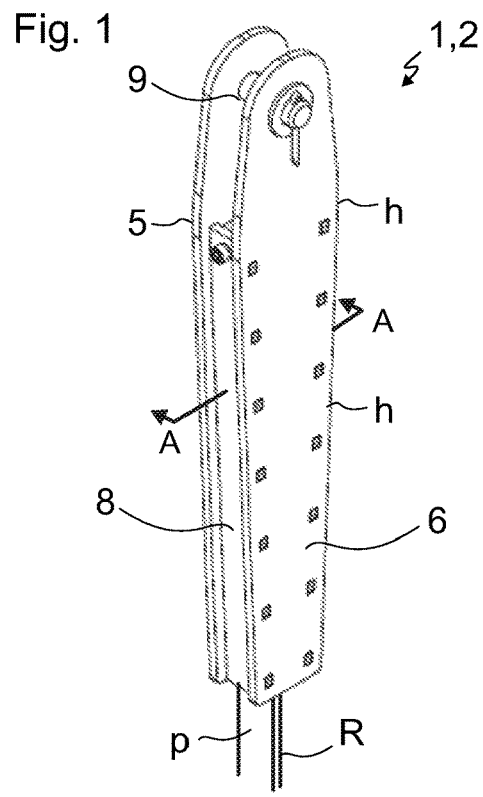
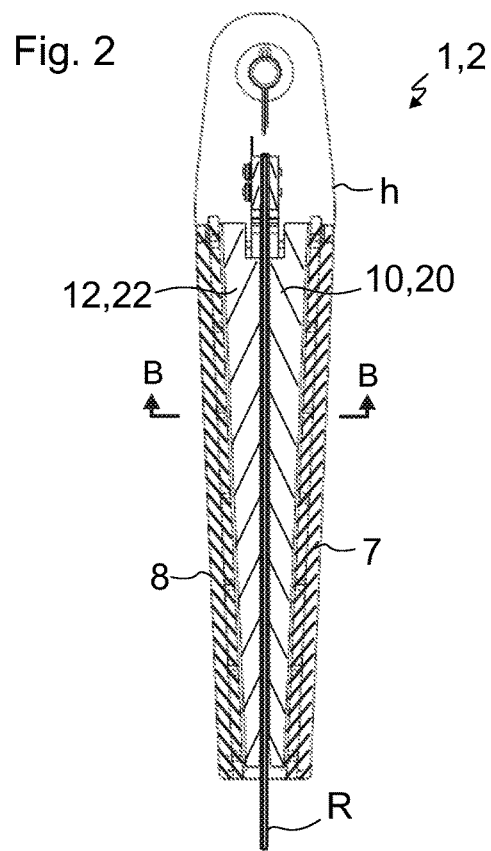

Fig. 7
Fig. 8
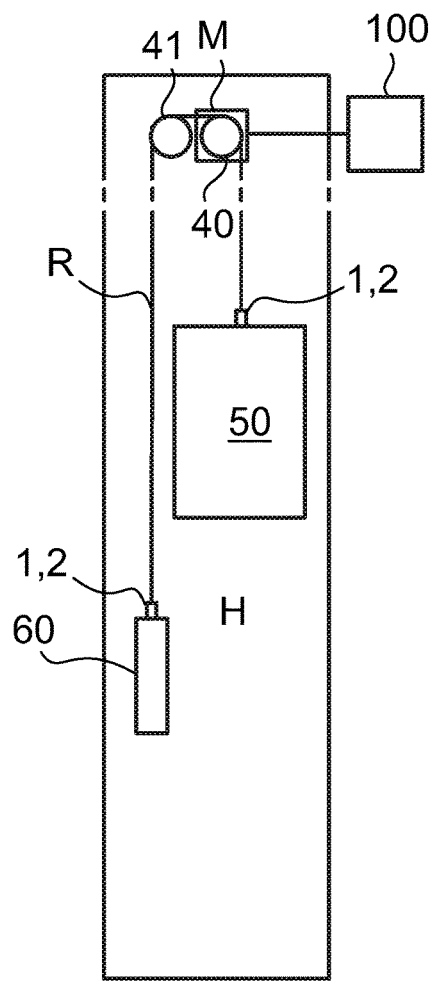
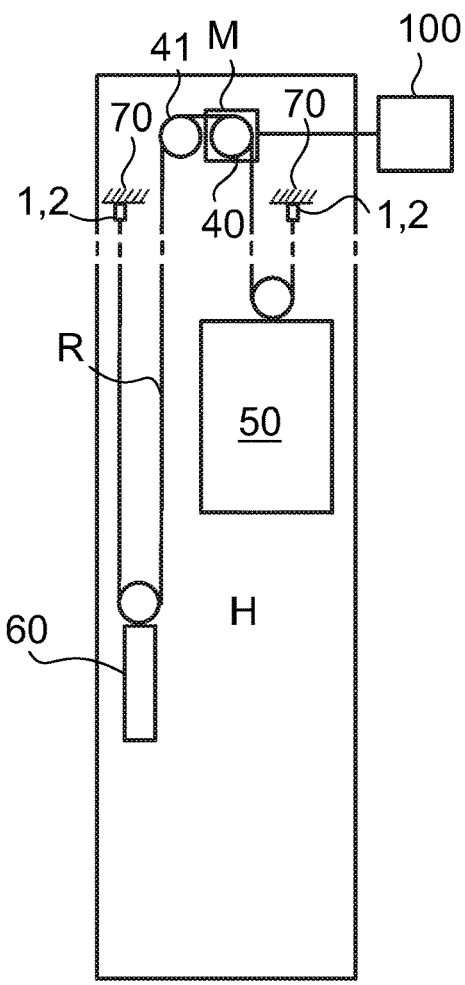
Fig. 9a
Fig. 9b
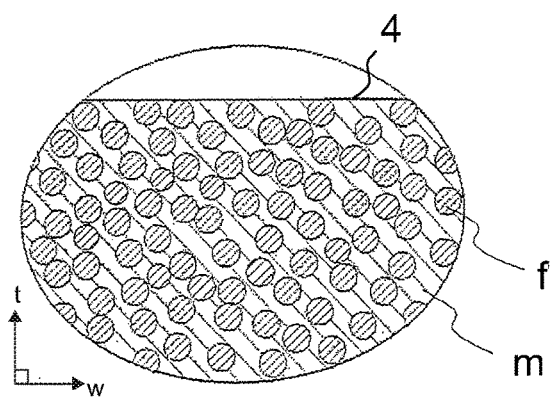
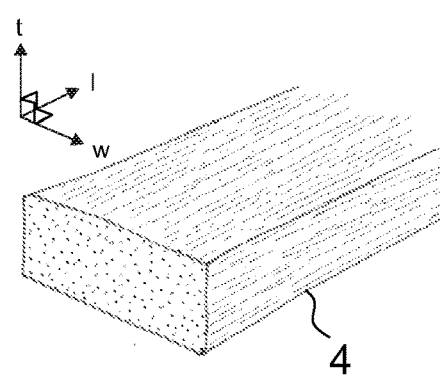

ROPE TERMINAL ASSEMBLY AND A HOISTING APPARATUS

FIELD OF THE INVENTION

The invention relates to fixing of a hoisting rope of a hoisting apparatus, more particularly to rope terminal assembly for fixing the hoisting rope. Said hoisting apparatus is preferably an elevator for transporting passengers and/or goods.

BACKGROUND OF THE INVENTION

Hoisting ropes typically include one or several load bearing members that are elongated in the longitudinal direction of the rope and each form a structure that continues unbroken throughout the length of the rope. Load bearing members are the members of the rope which are able to bear together the load exerted on the rope in its longitudinal direction. The load, such as a weight suspended by the rope, causes tension on the load bearing member in the longitudinal direction of the rope, which tension can be transmitted by the load bearing member in question all the way from one end of the rope to the other end of the rope. Ropes may further comprise non-bearing components, such as a coating, which cannot transmit tension in the above described way. The coating can be utilized for one or more purposes. For instance, the coating can be used to provide rope with a surface via which the rope can effectively engage frictionally with a drive wheel. The coating can also be used to provide the load bearing members of the rope with protection and/or for separating these from each other.

In a hoisting apparatus, the rope ends need to be fixed to a base, which is typically either the load to be lifted or a stationary structure. In the field of elevators, the rope ends can be fixed directly to the load, such as the car or counterweight, which is the case when these are to be suspended with 1:1 ratio. Alternatively, the rope ends can be fixed to a stationary structure of the building, which is the case when the car and counterweight are to be suspended with 2:1 ratio, for instance. In prior art, hoisting ropes have been fixed to the base with a rope terminal assembly.

In prior art such a rope terminal assembly has been proposed where the rope end is compressed in a nip formed between two compression members. This kind of configuration relies largely on the grip produced by the compression. The compression may be provided by a wedge-type structure, for instance, where wedging movement of wedge components in a rope terminal housing produces said compression. With this kind of configuration, the drawback is that when used with ropes that comprise a coating, the gripping ability may weaken in conditions which change the properties of the coating. As a result, the terminal assembly might malfunction such that the grip is not reliable any more. For example, as a result of exposure to extreme conditions, the coating may soften and ultimately melt. Said drawbacks have been noticed to be present particularly when the coating is made of thermoplastic material, and due to some abnormal event the rope terminal is exposed to high temperatures. Then the thermoplastic material gets softer and eventually melts. At the same time, compression is applied against the coating, so the coating material starts to be displaced pushed by the compression. In this kind of situation, problems in performance of the rope terminal assembly could be likely to cause some sort of malfunction. Problems could be caused also due to some of the coating being displaced into small gaps between the movable parts of the terminal assembly, such as between a housing and the wedge, such that proper relative movement between these two would be blocked. This would make their later operation unreliable. Great amount of melted coating material can also decrease friction between the rope and the compression member, working like a lubricant contributing to slipping of the rope away from the terminal assembly. In the worst case, the rope might slide away from the rope terminal.

BRIEF DESCRIPTION OF THE INVENTION

The object of the invention is to introduce a rope terminal assembly for coated hoisting ropes, which is improved in terms of its tolerance for melting of the coating material. An object is particularly to introduce a solution suitable for working reliably in high temperatures even though the coating would be made of thermoplastic material the rope thereby being susceptible for problematic behavior due to melting of the coating. The object of the invention is, inter alia, to solve one or more of the previously described drawbacks of known solutions and problems discussed later in the description of the invention. Advantageous embodiments are presented, inter alia, which are well suitable for belt-shaped hoisting ropes. Advantageous embodiments are further presented, inter alia, which are well suitable for hoisting ropes comprising load bearing members made of fragile material.

It is brought forward a new rope terminal assembly of a hoisting apparatus comprising a first compression member having a first contact face to be compressed against a wide side of the belt-shaped rope; and a second compression member having a second contact face to be compressed against a wide side of the belt-shaped rope; wherein said compression members are placed such that their contact faces face each other and delimit between them a gap; and wherein a belt-shaped rope, in particular an end thereof, having a thermoplastic polymer coating forming the outer surface of the rope, is placed in the gap, the contact faces of the compression members compressing against opposite wide sides of the belt-shaped rope. Said compression members are movable relative to each other such that the gap is narrowed, whereby the contact faces of the compression members are moveable towards each other so as to compress against opposite sides of the rope placed in the gap. One or both of the compression members comprises on the contact face thereof, and/or in proximity of the contact face thereof, one or more indentations, each indentation forming a cavity in the compression member which is in open connection with the gap, and thereby also with the rope placed in the gap, for allowing fluid passage from the gap into the cavity, the cavity being arranged to be empty when the thermoplastic polymer coating of the rope compressed by the contact face is solid, and to receive via said open connection thermoplastic polymer coating of the rope flowing from the gap pushed by the compression when the thermoplastic polymer coating melts. Thereby, in the assembly, each indentation forms an empty cavity for receiving polymer coating of the rope from the gap pushed by the compression when the polymer coating melts. As a result, fault-safe behavior of the coating in high temperatures can be facilitated. Hereby, one or more objects of the invention given above can be achieved. In particular, a safe rope terminal assembly for a rope having thermoplastic coating material can be provided.

In a first type of a preferred embodiment, said one or both of the compression members comprises on the contact face thereof said one or more indentations. Each indentation thereby forms the cavity as defined in the compression member between the rope and the compression member. The first type of a preferred embodiment has preferably one or more of the following preferable features.

Preferably, the contact face has contact regions contacting the side of the belt-shaped rope, and indentations as defined between the contact regions. Preferably, each of said contact regions is planar. It is further preferable that said contact regions are coplanar. Preferably, said contact regions define a plane of contact and said indentations extend behind the plane of contact. It is preferable, that each indentation is more than 1 mm deep. It is preferable, that each indentation is more than 1 mm wide. Preferably, in the first type of a preferred embodiment, said contact regions are either smooth or have a rough surface shape, such as knurling. Preferably, the contact regions cover substantially larger proportion of the contact face than the indentations.

Preferably, said rope comprises plurality of load bearing members, and the indentations are located at the points of the gaps between load bearing members next to each other. Preferably, no indentations are located at the points of the load bearing members and the contact regions are located at the points of the load bearing members. In this way, the highest normal forces are exerted by the compression members to the points of the rope where the load bearing members are located. Thus, the grip between the rope and the compression members can be facilitated and the adverse effects of empty indentations neutralized. In this way, also the flow of the melted thermoplastic polymer coating can be directed away from between the load bearing members and the contact regions.

In a second type of a preferred embodiment, said one or both of the compression members comprises on one or both flank faces thereof in proximity of the contact face, an indentation as defined. With the term flank it is referred to the face facing in width direction of the contact face, and thereby in width direction of the rope as well. The first type of a preferred embodiment has preferably one or more of the following preferable features.

Preferably, each said indentation forms a cavity as defined in the compression member between the compression member and the housing of the rope terminal assembly on which housing the compression member is mounted.

Preferably, the gap between the compression member and the housing is at the point of the indentation more than 1.5 mm, preferably more than 2 mm.

In general, the following features are further preferable for both types.

Preferably, the rope terminal assembly comprises a housing on which the compression members are mounted.

Preferably, the rope terminal assembly comprises a housing on which the compression members are mounted which housing is fixed to a fixing base, such as to an elevator car or to a counterweight or to a stationary structure of a building.

Preferably, the rope is arranged to suspend one or more loads of the hoisting apparatus, such as an elevator car or an elevator car and a counterweight.

Preferably, the compression members are wedge members, and the terminal assembly comprises a housing comprising a wedge surface for each wedge member, and the compression members are movable relative to each other such that the gap is narrowed by wedging of the compression members against the wedge surfaces of the housing when moved along the wedge surface of the housing.

Preferably, said indentations are elongated grooves. Said elongated grooves preferably extend parallel with the rope.

Preferably, said rope comprises one or more load bearing members embedded in said thermoplastic polymer coating (p) and extending parallel to the longitudinal direction of the rope unbroken throughout the length of the rope.

Preferably, the width/thickness ratio of the rope is more than two, preferably more than 4. Thereby, the bending resistance of the rope is small but the load bearing total cross sectional area can be made vast.

Preferably, the width/thickness ratio of each of said one or more load bearing members is more than 2. Thereby, the bending resistance of the rope is small but the load bearing total cross sectional area is vast with minimal non-bearing areas.

Preferably, said load bearing members have planar 'wide' sides facing in thickness direction of the rope, i.e. towards the contact faces. Thereby, they can be effectively affected by the compression applied on the rope by the contact faces provided with planar contact regions.

Preferably, said one or more load bearing members is/are made of composite material comprising reinforcing fibers in polymer matrix, said reinforcing fibers preferably being carbon fibers.

Preferably, the contact faces are straight as viewed in longitudinal direction of the rope. Likewise, the rope (section) placed between them is also straight, i.e. not bent into an arc. Thus, the rope terminal assembly is well suitable for a hoisting rope that is rigid, and needs to be fixed by a rope terminal assembly without bending. Thus, it is particularly well suitable for a rope where the load bearing member(s) is/are made of composite material, such as defined above. Composite material of this kind is typically rigid in all directions and thereby also difficult to bend. Rigid ropes being difficult to bend without fracturing them, they cannot be fixed with means requiring sharp bends.

Preferably, the reinforcing fibers of each load bearing member are substantially evenly distributed in the polymer matrix of the load bearing member in question. Furthermore, preferably, over 50% of the cross-sectional square area of the load bearing member consists of said reinforcing fibers. Thereby, a high tensile stiffness can be facilitated. Preferably, the load bearing members cover together over proportion 50% of the cross-section of the rope.

Preferably, the module of elasticity E of the polymer matrix is over 2 GPa, most preferably over 2.5 GPa, yet more preferably in the range 2.5-10 GPa, most preferably of all in the range 2.5-3.5 GPa. In this way a structure is achieved wherein the matrix essentially supports the reinforcing fibers, in particular from buckling. One advantage, among others, is a longer service life.

Preferably, substantially all the reinforcing fibers of each load bearing member are parallel with the longitudinal direction of the load bearing member. Thereby the fibers are also parallel with the longitudinal direction of the rope as each load bearing member is oriented parallel with the longitudinal direction of the rope. This facilitates further the longitudinal stiffness of the rope. In this context the disclosed rope terminal assembly is particularly advantageous, because it does necessitate sharp bending of the rope.

Preferably, the rope comprises a plurality of said load bearing members spaced apart in width direction of the rope the coating extending between load bearing members next to each other.

It is brought forward a new hoisting apparatus, such as an elevator, which comprises a rope terminal assembly as defined in any of the preceding claims fixing an end of a rope of the hoisting apparatus immovably to a fixing base. Preferably, the rope is arranged to suspend at least one load.

Preferably, said hoisting apparatus is an elevator. Preferably, said elevator comprises a hoistway; one or more elevator units vertically movable in the hoistway, including at least an elevator car; one or more ropes, each rope being connected with said one or more elevator units and having two ends, each end being fixed immovably to a fixing base, said fixing base being one of the elevator units or a stationary structure of the building wherein the elevator is installed; and on one or both of said ends a rope terminal assembly as described anywhere above or elsewhere in the application, fixing the end of the rope in question immovably to said fixing base. Preferably, the rope is arranged to suspend one or more elevator units, including at least an elevator car.

Preferably, the more ropes passes around one or more rope wheels mounted in proximity of the upper end of the hoistway, such as inside the upper end of the hoistway or inside a space beside or above the upper end of the hoistway. Preferably, the rope passes around said one or more rope wheels turning around an axis extending in width direction of the rope.

As mentioned, the hoisting apparatus is preferably, but not necessarily an elevator. The elevator is preferably such that the car thereof is arranged to serve two or more landings. The elevator preferably controls movement of the car in response to calls from landing and/or destination commands from inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which FIG. 1 illustrates an embodiment of a rope terminal assembly of a hoisting apparatus FIG. 2 illustrates cross section A-A of FIG. 1.

FIGS. 7 and 8 each illustrate an elevator implementing the rope terminal assembly of FIG. 1.

FIG. 9*a* illustrates preferred partially a cross section of a load bearing member of the rope as viewed in longitudinal direction of load bearing member and the rope.

FIG. 9*b* illustrates three-dimensionally a load bearing member of the rope.

Figure 3:
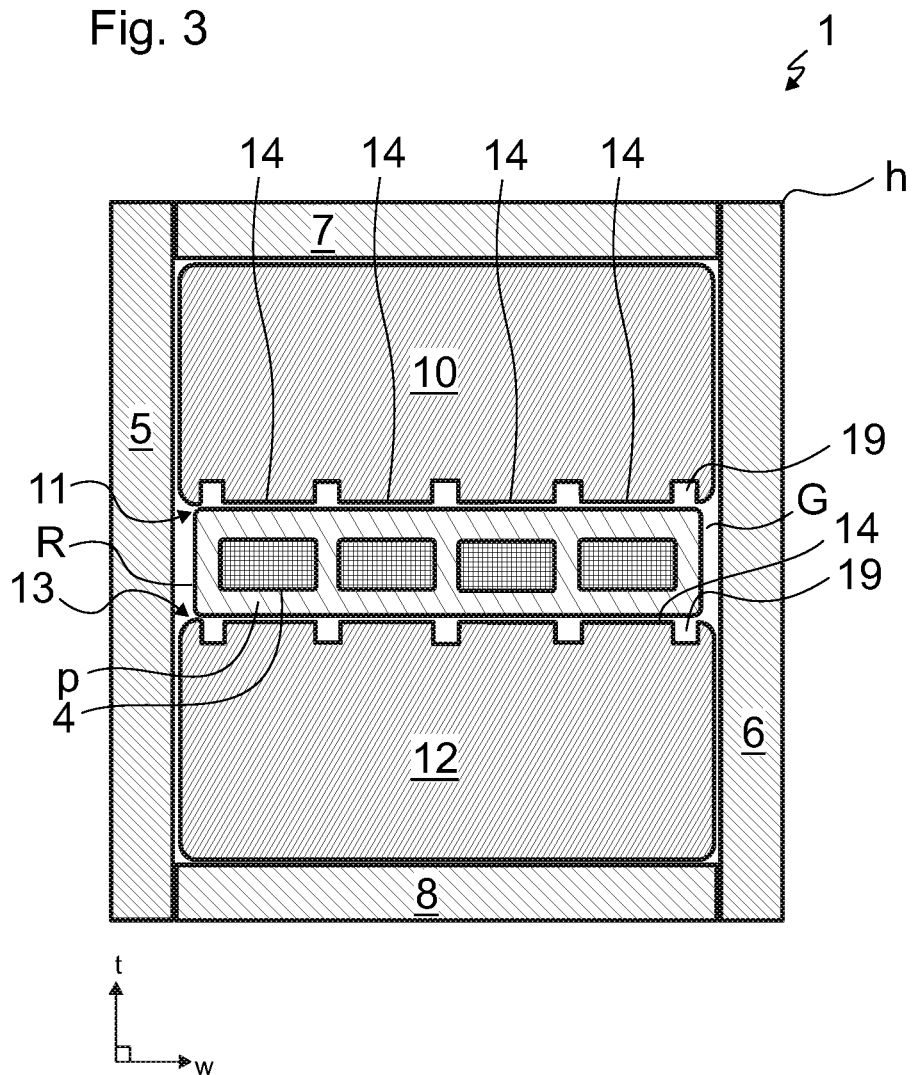
FIG. 3 illustrates cross section B-B of FIG. 2 in accordance with a first type.

The foregoing aspects, features and advantages of the invention will be apparent from the drawings and the detailed description related thereto.

DETAILED DESCRIPTION

FIG. 1 illustrates an embodiment of a rope terminal assembly 1,2 of a hoisting apparatus. FIG. 2 illustrates a cross section A-A of the rope terminal assembly 1,2 of FIG. 1. The rope terminal assembly 1,2 comprises a belt-shaped rope R having a thermoplastic polymer coating p forming the outer surface of the rope R, as well as a first compression member 10;20 having a first contact face 11;21 compressed against a wide side of an end of the belt-shaped rope R; and a second compression member 12;22 having a second contact face 13;23 compressed against a wide side of an end of the belt-shaped rope R. Said compression members 10,12; 20,22 are placed such that their contact faces face each other and delimit between them a gap G, the end of the belt-shaped rope R being placed in the gap G. The contact faces 11,13;21,23 of the compression members 10,12;20,22 compress against opposite wide sides of the belt-shaped rope R, thereby compressing against the thermoplastic polymer coating p. Said compression members 10,12;20,22 are movable relative to each other such that the gap G is narrowed, whereby the contact faces 11,13;21,23 of the compression members 10,12;20,22 are moveable towards each other so as to compress against opposite sides of the rope R placed in the gap. Thus, compression can be maintained even though the shape of the rope R, in particular its thickness, would change.

In addition to said thermoplastic polymer coating p forming the outer surface of the rope R, the rope R comprises one or more load bearing members 4 embedded in said thermoplastic polymer coating p and extending parallel to the longitudinal direction of the rope R unbroken throughout the length of the rope R.

For providing a supporting structure for the compression members 10,12;20,22 affecting the rope R, the rope terminal assembly 1,2 comprises a housing h on which the compression members 10,12;20,22 are mounted. The housing h comprises a fixing means 9 via with the housing h can be fixed to a base. In the embodiments illustrated, said fixing means 9 is a fixing bolt, but could alternatively be in some other form.

Figure 5:
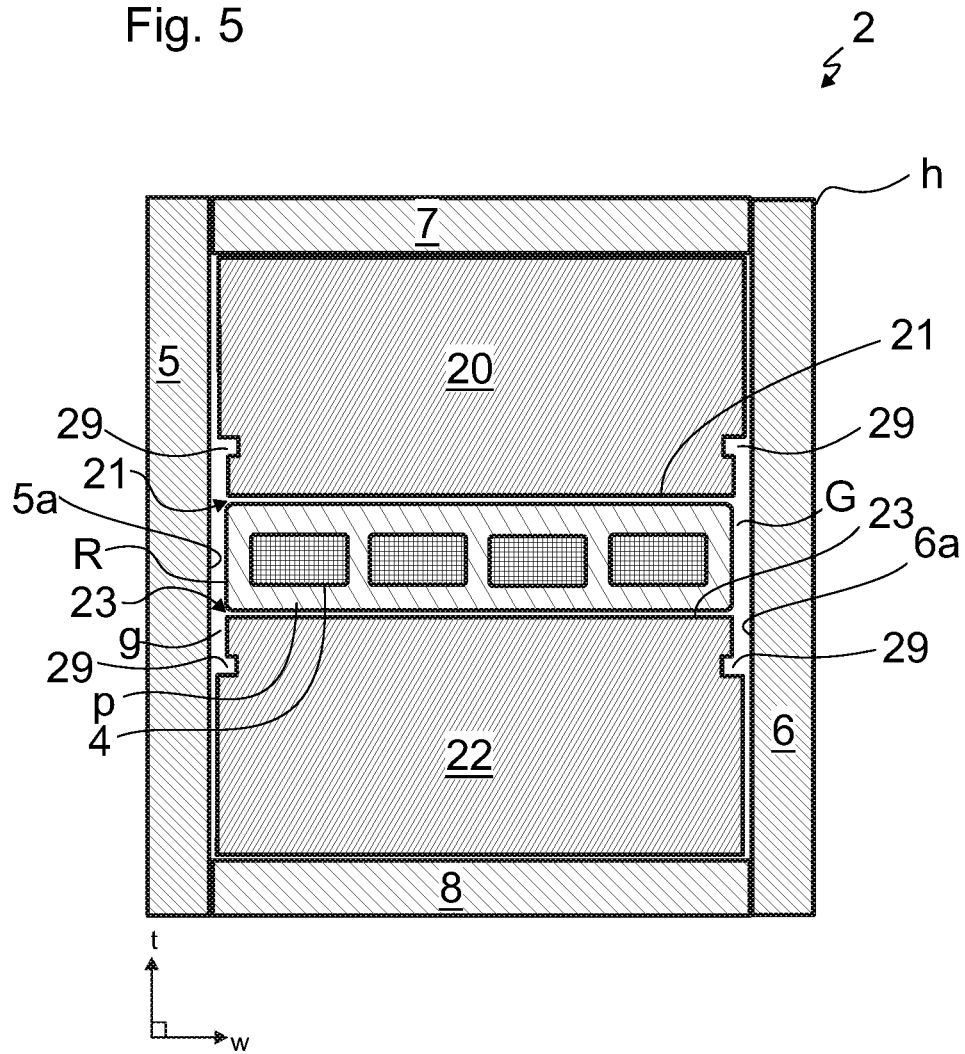
FIG. 5 illustrates cross section B-B of FIG. 2 in accordance with a second type.

FIGS. 3 and 5 illustrate alternative detailed structures for the rope terminal assembly 1,2. In these cases, one or both of the compression members 10,12;20,22 (in the illustrations both of them) comprises on the contact face 11,13 thereof, or in proximity of the contact face 21,23 thereof, one or more indentations 19,29, each indentation 19,29 forming a cavity in the compression member 10,12;20,22 which is in open connection with the gap G, and thereby also with the rope placed in the gap, for allowing fluid passage from the gap into the cavity. Said open connection means that an unobstructed passageway exists between the cavity and the gap G. The cavity 19,29 is arranged to be empty when the thermoplastic polymer coating p of the rope R compressed by the contact face in question is solid, and to receive, via said connection, thermoplastic polymer coating p of the rope R flowing from the gap G pushed by the compression when the thermoplastic polymer coating p melts.

Accordingly, each indentation 19,29 forms an empty cavity for receiving polymer coating p of the rope R from the gap G pushed by the compression if/when the polymer coating p melts thereby becoming fluidic.

Figure 4:
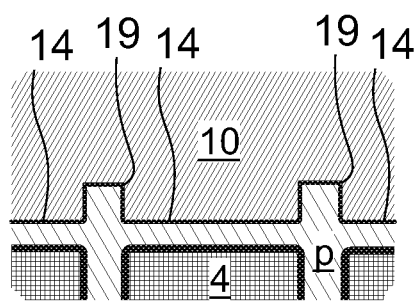
FIG. 4 illustrates a detail of the rope terminal assembly of FIG. 3 when the coating of the rope has melted and part of it has flown into an indentation.
Figure 6:
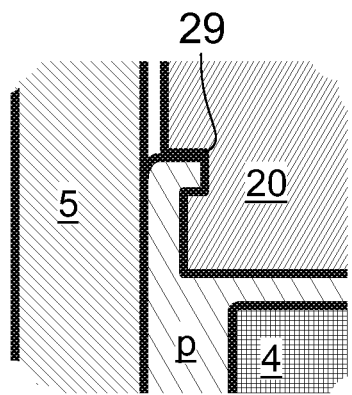
FIG. 6 illustrates a detail of the rope terminal assembly of FIG. 5 when the coating of the rope has melted and part of it has flown into an indentation.

FIG. 4 illustrates an enlarged view of the rope surface and the cavity 19 of the embodiment of FIG. 3 in a situation wherein the thermoplastic polymer coating p has melted and part of it has flown into an indentation 19. Correspondingly, FIG. 6 illustrates an enlarged view of the rope surface and the cavity 29 of the embodiment of FIG. 5 in a situation wherein the thermoplastic polymer coating p has melted and part of it has flown into an indentation 29. In both cases, the cavity formed by the indentation 19,29 has received the excess coating p flown from the gap G displaced by the compression. Thereby the indentation 19,29 has not reached to extend into between the housing h and the compression member 10,20 and thereby proper relative movement between these two is not blocked.

The embodiment of FIG. 3 is more specifically as explained in the following. Said one or both (in this case both) of the compression members 10,12 comprises on the contact face 11,13 thereof said one or more indentations 19. Each indentation 19 forms a cavity as defined in the compression member 10,12 between the rope and the compression member 10,12. The cavity 19 is in open connection (i.e. connected with an unobstructed passageway) with the gap G for allowing fluid passage from the gap G into the cavity 19, because the indentation is open towards the gap G and the rope R placed therein. The contact face is contoured to have contact regions 14 contacting the side of the belt-shaped rope R, and indentations 19 as earlier described, which are between the contact regions 14. Each of said contact region 14 is arranged to reach into contact with and compress against the wide side of the belt-shaped rope R when the contact face 11,13 is compressed against it. Each of said indentations 19 on the other hand forms a cavity which is empty when the thermoplastic polymer coating p of the rope R is solid, providing an empty space wherein thermoplastic polymer coating p of the rope R can flow when it is melted, i.e. becomes fluidic, while the contact face 11,13 is compressed against the wide side of the belt-shaped rope R.

In this preferred embodiment, said contact regions 14 are such that they define together a plane of contact and said indentations extend behind the plane of contact. Particularly, said contact regions 14 are in the illustrated preferred embodiment coplanar. It is preferable that the indentations are more than 1 mm deep. In general, it is preferable that their depth is more than half of the thickness of the coating p as measured at the point of the load bearing member 4 of the rope R.

In the preferred embodiments, said contact regions 14 are planar, as showed in FIG. 3, for instance. The regions of the belt-shaped rope R that are in contact with said contact regions 14, are then preferably also planar, whereby the regions of the rope R and the contact face that are in contact are parallel with each other. Thereby, an even normal force is obtained. This is realized, when the wide sides of the belt-shaped rope R are planar as in the illustrated embodiments, for instance. Said planar contact regions 14 may be smooth, as showed in FIG. 3. However, said contact regions 14 could alternatively have a rough surface shape, for example to have a knurling, which facilitates the grip.

So as to facilitate good grip between the rope and the compressing face, it is preferable that the contact regions 14 cover together substantially larger proportion of the contact face 11,13 than the indentations 19. With proportions of coverage it is referred to coverage of area of the contact face. Most preferably, the contact regions 14 cover together more than 60% proportion of the contact face 11,13. The indentations 19, on the other hand preferably cover together less than 40% proportion of the contact face 11,13. However, so as to obtain a substantial capacity for receiving flow of melted thermoplastic polymer coating p such that safety in high temperatures is clearly improved, the indentations 19, should not be made to cover too small proportion. The best proportions for each case can be determined by testing.

However, it has been determined that so as to achieve reasonably good capacity to receive flow of melted thermoplastic polymer coating p, it is preferable that the indentations 19 do not cover together less than 15% proportion of the contact face 11,13. For ensuring safety in most situations, the coverage of the indentations 19 together is preferably, however, at least 20%.

In the embodiment of FIG. 3, said indentations 19 are elongated grooves. This kind of indentations can be simply formed on a compression member 10,12. Each indentation 19, i.e. here a groove 19, extends in the presented case parallel with the longitudinal direction of the rope R. Each groove 19 extends preferably across the whole length of the contact face 11,13, whereby their number can be set small. In the presented case, there are several of such grooves distributed across the width of the contact face.

In the presented case, the indentations 19, i.e. here the grooves, have been distributed in a particular way with regard to the rope's R construction. The rope R comprises in this case a plurality of load bearing members 4 extending parallel to the longitudinal direction of the rope R unbroken throughout the length of the rope R. The indentations 19, are located at the points of the gaps between load bearing members 4 next to each other. No indentations 19 are located at the points of the load bearing members 4 and the contact regions 14 are located at the points of the load bearing members 4. In this way, the highest normal forces are exerted by the compression members to the points of the rope R where the load bearing members 4 are located. Thus, the grip between the rope and the compression members 10,12 can be facilitated and the adverse effects of empty indentations neutralized. In this way, also the flow of the melted thermoplastic polymer coating p can be directed away from between the load bearing members 4 and the contact regions 14.

The embodiment of FIG. 5 is more specifically as explained in the following. Said one or both (in this case both) of the compression members 20,22 comprises in proximity of the contact face 21,23, in this case on one or both flank faces thereof an indentation 29. Each said indentation 29 forms a cavity as above defined in the compression member 10,12 between the compression member 20,22 and the housing h of the rope terminal assembly 2 on which housing h the compression member 20,22 is mounted. The cavity 29 is in open connection with the gap G for allowing fluid passage from the gap G into the cavity 29, because there is a gap g between the housing h and the compression member 20,22, which gap g forms an open passageway between the gap G and the indentation 29. Said gap g is preferably at least 1 mm. The gap between the compression member 20,22 and the housing h at the point of the indentation, on the other hand, is preferably more than 1.5 mm, preferably more than 2 mm.

Referring to the structure of the rope terminal assembly 1,2 in general, it is preferable that the compression members are wedge members as also shown in the FIGS. 1 and 2. Then, the terminal assembly preferably comprises a housing h comprises a wedge surface for each wedge member, and the compression members 10,12;20,22 are movable relative to each other such that the gap G is narrowed by wedging of the compression members 10,12;20,22 against the wedge surfaces of the housing h when moved along the wedge surface of the housing h. In the embodiments illustrated, the plate members 8 and 9 of the housing h have each an inclined surface forming the wedge surface for the compression members 10,12;20,22, which are formed to have a wedge shape.

The coating p forming the outer surface of the rope R is preferably made of thermoplastic polymer material. It is preferable that the thermoplastic polymer is then thermoplastic polyurethane, because polyurethane provides the rope R good frictional properties and wear resistance. Polyurethane is in general well suitable for elevator use. Polyurethane is available both in thermosetting and thermoplastic type, however in this case polyurethane of thermoplastic type should be used.

FIGS. 7 and 8 illustrate preferred embodiments of a hoisting apparatus in the form of an elevator. The elevator comprises a hoistway H and elevator units 50,60 vertically movable in the hoistway H. The elevator units 50,60 include in this case an elevator car 50 and a counterweight 60. In both cases, the elevator further comprises one or more ropes R, each being connected with said elevator units 50, 60 and having two ends, each end being fixed immovably to a fixing base 50,60,70. Each said rope suspends the elevator units 50,60 whereto it is connected. Accordingly, the rope R is in this case a suspension rope R of the elevator. Said elevators differ from each other in terms of their suspension ratios, i.e. how the ropes have been connected with the elevator units. In the embodiment of FIG. 7, the fixing base is for one end of the rope R the elevator unit 50 and for the other end the elevator unit 60. In the embodiment of FIG. 8, on the other hand, the fixing base is for both ends of the rope R a stationary structure 70 of the building wherein the elevator is installed. The elevator further comprises a rope terminal assembly 1,2 provided on each of said ends fixing the end in question immovably to its fixing base 50,60,70. The rope terminal assembly 1,2 is as described elsewhere in the application.

The elevator illustrated in each of FIGS. 7 and 8 is more specifically such that it comprises one or more upper rope wheels 40,41 mounted higher than the car 50 and the counterweight 60, in this case particularly in proximity of the upper end of the hoistway H. In this case there are two of said rope wheels 40,41 but the elevator could be implemented also with some other number of rope wheels. Each of said one or more hoisting ropes R pass around said one or more rope wheels 40,41 mounted in proximity of the upper end of the hoistway H. In this case the one or more rope wheels 40,41 are mounted inside the upper end of the hoistway, but alternatively they could be mounted inside a space beside or above the upper end of the hoistway H. Said one or more rope wheels 40,41 comprise a drive wheel 40 engaging said one or more hoisting ropes R and the elevator comprises a motor M for rotating the drive wheel 40. The elevator car 50 can be moved by rotating the drive wheel 40 engaging the rope(s) R. The elevator further comprises an elevator control unit 100 for automatically controlling rotation of the motor M, whereby the movement of the car 50 is also made automatically controllable.

Each of said one or more hoisting ropes R is belt-shaped and passes around the one or more rope wheels 40,41 the wide side thereof, i.e. the side facing in thickness direction t of the rope R, resting against the rope wheel 40,41. Each hoisting rope passes around the one or more rope wheels 40,41 turning around an axis extending in width direction w of the hoisting rope R.

As mentioned, the belt-shaped rope R has a thermoplastic polymer coating p forming the outer surface of the rope. With the coating, the rope is provided with a surface via which the rope can effectively engage frictionally with a drive wheel, if desired. Thus, it is also possible to provide the load bearing members 4 with protection as well as friction properties adjustable to perform well in the intended use, for instance in terms of traction. The indentations 19,29 provided on the rope terminal assembly 1,2 in the defined way facilitate safety of the elevator in case the rope terminal assembly 1,2 is subjected to high temperatures for any reason, such as a fire. Thus, thermoplastic polymer coating p can safely be used.

The elevator may further comprise in addition to said ropes R, second ropes interconnecting the elevator car 50 and the counterweight 60, which may be arranged to serve as so called compensation ropes of the elevator. Also these ropes can be fixed by means of the rope terminal assembly 1,2 as described elsewhere in the application. For this roping, the elevator comprises one or more 'lower' rope wheels mounted lower than the car 50 and the counterweight 60, and particularly in proximity of the lower end of the hoistway H. Each of said second ropes would then pass around said one or more lower rope wheels.

As mentioned, the rope R comprises one or more load bearing members 4 extending parallel to the longitudinal direction of the rope R unbroken throughout the length of the rope R. FIG. 9a illustrates a preferred inner structure for said load bearing member 4, showing presented inside the circle in particular the cross section of the load bearing member 4 close to the surface thereof, as viewed in the longitudinal direction I of the load bearing member 4. The parts of the load bearing member 4 not showed in FIG. 9a have a similar structure. FIG. 9b illustrates the load bearing member 4 three dimensionally. The load bearing member 4 is made of composite material comprising reinforcing fibers f embedded in polymer matrix m. The reinforcing fibers f are more specifically distributed in polymer matrix m and bound to each other by the polymer matrix. The load bearing member 4 formed is a solid elongated rod-like one-piece structure. The reinforcing fibers f are distributed preferably substantially evenly in the polymer matrix m. Thereby a load bearing member with homogeneous properties and structure is achieved throughout its cross section. In this way, it can be also ensured that each of the fibers f can be in contact and bonded with the matrix m. Said reinforcing fibers f are most preferably carbon fibers, but alternatively they can be glass fibers, or possibly some other fibers. Preferably, substantially all the reinforcing fibers f of each load bearing member 4 are parallel with the longitudinal direction of the load bearing member 4. Thereby the fibers are also parallel with the longitudinal direction of the rope R as each load bearing member 4 is oriented parallel with the longitudinal direction of the rope R. This is advantageous for the rigidity as well as behavior in bending. Owing to the parallel structure, the fibers in the rope R will be aligned with the force when the rope R is pulled, which ensures that the structure provides high tensile stiffness. The fibers f used in the preferred embodiments are accordingly substantially untwisted in relation to each other, which provides them said orientation parallel with the longitudinal direction of the rope R. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member, the fibers f preferably continuing for the whole length of the load bearing member 4 as well as the rope R.

As mentioned, the reinforcing fibers f are preferably distributed in the aforementioned load bearing member 4 substantially evenly, in particular as evenly as possible, so that the load bearing member 4 would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of a force exerted on the fibers, reduces fiber-fiber contacts and internal wear of the rope, thus improving the service life of the rope R. The composite matrix m, into which the individual fibers f are distributed as evenly as possible, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used.

The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

The reinforcing fibers f being in the polymer matrix means here that the individual reinforcing fibers f are bound to each other with a polymer matrix m, e.g. in the manufacturing phase by immersing them together in the fluid material of the polymer matrix which is thereafter solidified. In this case the gaps of individual reinforcing fibers bound to each other with the polymer matrix comprise the polymer of the matrix. In this way a great number of reinforcing fibers bound to each other in the longitudinal direction of the rope are distributed in the polymer matrix. As mentioned, the reinforcing fibers are preferably distributed substantially evenly in the polymer matrix m, whereby the load bearing member is as homogeneous as possible when viewed in the direction of the cross-section of the rope. Owing to the even distribution, the fiber density in the cross-section of the load bearing member 4 is substantially constant.

The reinforcing fibers f together with the matrix m form a uniform load bearing member, inside which no substantial abrasive relative movement occurs when the rope is bent. The individual reinforcing fibers f of the load bearing member 4 are mainly surrounded with polymer matrix m, but random fiber-fiber contacts can occur because controlling the position of the fibers in relation to each other in their simultaneous impregnation with polymer is difficult, and on the other hand, perfect elimination of random fiber-fiber contacts is not necessary from the viewpoint of the functioning of the solution. If, however, it is desired to reduce their random occurrence, the individual reinforcing fibers f can be pre-coated with material of the matrix m such that a coating of polymer material of said matrix is around each of them already before they are brought and bound together with the matrix material, e.g. before they are immersed in the fluid matrix material.

As above mentioned, the matrix m of the load bearing member 4 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the load bearing member 4, among other things, it is therefore preferred that the polymer matrix m is hard, and in particular non-elastomeric. The most preferred materials for the matrix are epoxy resin, polyester, phenolic plastic or vinyl ester. The polymer matrix m is preferably so hard that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix m which can provide these material properties. Preferably over 50% proportion of the surface area of the cross-section of the load bearing member 4 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 4 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well.

The load bearing members 4 can be prepared with a surface treatment for firmer bonding with said material of the coating p prior to the application of the coating p thereon. This is advantageous, but not necessary. The surface treatment may take the form of any known plasma treatment, for example. This is advantageous particularly when the load bearing members are made of composite material as described. In plasma treatment, bonding between the load bearing member and the coating p is improved particularly for the reason that plasma treatment increases surface energy of the composite material. Preferably, the plasma treatment is flame plasma treatment, athmospheric plasma treatment, chemical plasma treatment, RF-plasma treatment or microwave-plasma treatment. The plasma treatment can be in the cathegory of cold plasma treatment or hot plasma treatment, for instance. The firmer bonding resulting from the surface treatment facilitates the grip between the compression members and the rope during melting of the coating. Such surface treatment may also increase the friction between the load bearing members and the compression members should the melting progress so far that those reach into contact.

In the illustrated embodiments, the load bearing members 4 are substantially rectangular and larger in width direction than thickness direction. However, this is not necessary as alternative shapes could be used. Likewise, it is not necessary that the number of the load bearing members is four which is used for the purpose of the example. The number of the load bearing members 4 can be greater or smaller. The number can be one, two or three for instance, in which cases it may be preferably to shape it/them wider than what is shown in Figures.

As mentioned, the rope R is belt-shaped, whereby it is larger in its width direction w than in its thickness direction t. As a result, it has opposing wide sides each being contacted by one of said contact faces 11,13;21,23. The width/thickness ratio of the rope is preferably at least at least 4, more preferably at least 5 or more, even more preferably at least 6. In this way a large cross-sectional area for the rope is achieved, the bending capacity around the width-directional axis being good also with rigid materials of the load bearing member. Thereby the rope suits well to be used in hoisting appliances, in particular in elevators, wherein the rope R needs to be guided around rope wheels. Also, it is preferable that the load bearing members are wide. Accordingly, each of said one or more load bearing members 4 is preferably larger in its width direction w than in its thickness direction t. Particularly, the width/thickness ratio of each of said one or more load bearing members is preferably more than 2. Thereby, the bending resistance of the rope is small but the load bearing total cross sectional area is vast with minimal non-bearing areas.

The rope R is furthermore such that the aforementioned load bearing member 4 or a plurality of load bearing members 4, comprised in the rope R, together cover majority, preferably 70% or over, more preferably 75% or over, most preferably 80% or over, most preferably 85% or over, of the width of the cross-section of the rope R for essentially the whole length of the rope R. Thus the supporting capacity of the rope R with respect to its total lateral dimensions is good, and the rope R does not need to be formed to be thick. This can be simply implemented with the composite as specified elsewhere in the application and this is particularly advantageous from the standpoint of, among other things, service life and bending rigidity in elevator use. The width of the rope R is thus also minimized by utilizing their width efficiently with wide load bearing member and using composite material. Individual belt-like ropes and the bundle they form can in this way be formed compact.

In the preferred embodiments, the load bearing members 4 have planar wide sides facing in thickness direction of the rope R, i.e. towards the contact faces. Thereby, they can be effectively affected by the compression applied on the rope by the contact faces provided with planar contact regions 14.

In the preferred embodiments presented in the Figures, the elevator is a counterweighted elevator. However, the rope terminal assembly can be likewise utilized in a counterweightless elevator.

In the preferred embodiments presented in the Figures, the hoisting apparatus wherein the rope terminal assembly has been utilized is an elevator. However, the rope terminal assembly could be utilized in some other type of hoisting apparatus that comprises a rope that needs to be fixed to a base, such as a crane.

In the preferred embodiments presented in the FIGS. 7 and 8, both ends of the rope R have been fixed to similar type of a fixing base. However, the elevator could alternatively be such that one end of the rope is fixed to a one of the movable elevator units 50,60 and the other end to the stationary structure 70 of the building, which would be the case if the suspension ratios need to be set different on opposite sides of the drive wheel 40, for instance.

In the preferred embodiments presented in the Figures, rope R is a flat rope having planar wide sides. However, the rope could alternatively be contoured to have some other shape, such as a polyvee-shape, for example. In this case, it is preferable that the contact faces are contoured to have a counterpart shape for the shape of the rope. Either one of the alternative types, or even both of them simultaneously, can be implemented also when the rope has been contoured to have some other shape than presented in Figures. In case of a polyvee rope, the rope has longitudinal grooves and ribs on one or both of its wide sides. In this kind of configuration, it is preferable that each contact face compressing against a polyvee surface of the rope also has longitudinal grooves and ribs forming a counterpart shape for the shape of the rope. Should the configuration then be designed in accordance with the first type, i.e. with said indentations on a contact face, then it is preferable that each contact region of the contact face has a wedge shape extending into one of the grooves of the rope.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope terminal assembly of a hoisting apparatus comprising:
a first compression member having a first contact face; and
a second compression member having a second contact face,
wherein said first and second compression members are placed such that their contact faces face each other and delimit between them a gap,
wherein a belt-shaped rope having a thermoplastic polymer coating forming the outer surface of the rope is placed in the gap, the contact faces of the compression members compressing against opposite sides of the belt-shaped rope,
wherein one or both of the compression members comprises on the contact face thereof a plurality of indentations, each indentation forming a cavity in the compression member open to the gap and configured in such a manner that when the thermoplastic polymer coating of the rope compressed by the contact face is solid, the cavity is empty, and when the thermoplastic polymer coating melts, the cavity receives thermoplastic polymer coating of the rope flowing from the gap pushed by the compression, and
wherein the contact face includes contact regions defined between adjacent indentations and contacting a side of the belt-shaped rope, all of the contact regions on each of the contact face are coplanar with one another, and parallel with said side of the belt-shaped rope, a coverage of area of the contact regions together is more than 60% of the contact face, and a coverage of the indentations together is at least 20% and less than 40% of the contact face.

2. The rope terminal assembly according to claim 1, wherein the indentations are defined between the contact regions.

3. The rope terminal assembly according to claim 1, wherein the rope terminal assembly comprises a housing on which the compression members are mounted, which housing is fixed to a fixing base.

4. The rope terminal assembly according to claim 1, wherein the compression members are wedge members, and the terminal assembly comprises a housing comprising a wedge surface for each compression member, and the compression members are movable relative to each other such that the gap is narrowed by wedging of the compression members against the wedge surfaces of the housing when moved along the wedge surface of the housing.

5. The rope terminal assembly according to claim 1, wherein said indentations are elongated grooves.

6. The rope terminal assembly according to claim 5, wherein said elongated grooves extend parallel with the rope.

7. The rope terminal assembly according to claim 1, wherein said rope comprises one or more load bearing members embedded in said thermoplastic polymer coating and extending parallel to the longitudinal direction of the rope unbroken throughout the length of the rope.

8. The rope terminal assembly according to claim 1, wherein said one or more load bearing members is/are made of composite material comprising reinforcing fibers in polymer matrix.

9. The rope terminal assembly according to claim 1, wherein said rope comprises plurality of load bearing members, and the indentations are located at points of gaps between two immediately adjacent load bearing members.

10. A hoisting apparatus comprising the rope terminal assembly as defined in claim 1 fixing an end of a rope of the hoisting apparatus immovably to a fixing base.

11. The rope terminal assembly according to claim 1, wherein the rope terminal assembly comprises a housing on which the compression members are mounted, which housing is fixed to an elevator car or to a counterweight or to a stationary structure of a building.

12. The rope terminal assembly according to claim 1, wherein said one or more load bearing members is/are made of composite material comprising reinforcing fibers in polymer matrix, said reinforcing fibers being carbon fibers.

13. An elevator, comprising the rope terminal assembly as defined in claim 1 fixing an end of a rope of the hoisting apparatus immovably to a fixing base.

* * * * *